May 18, 1965          J. GRILLO          3,184,673
VOLTAGE REGULATOR WITH FREQUENCY MULTIPLICATION DETECTOR MEANS
Filed Dec. 8, 1961
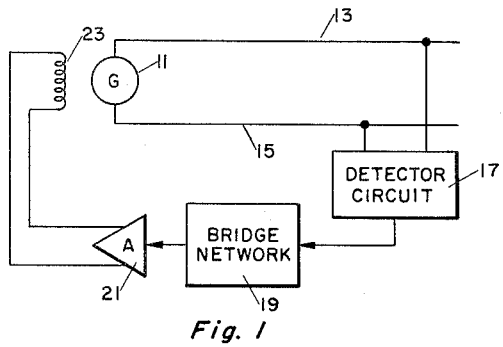
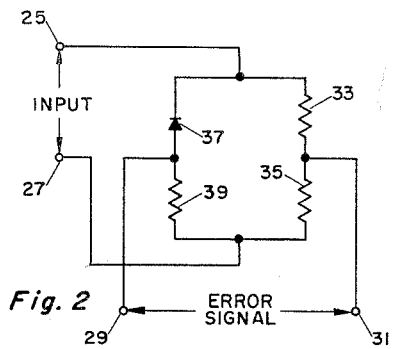
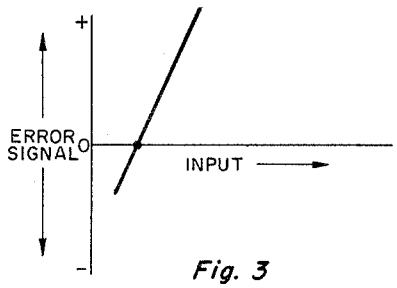
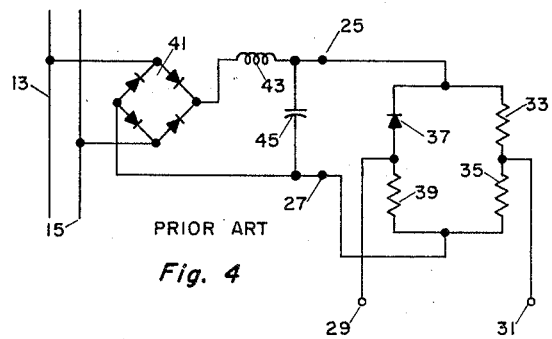
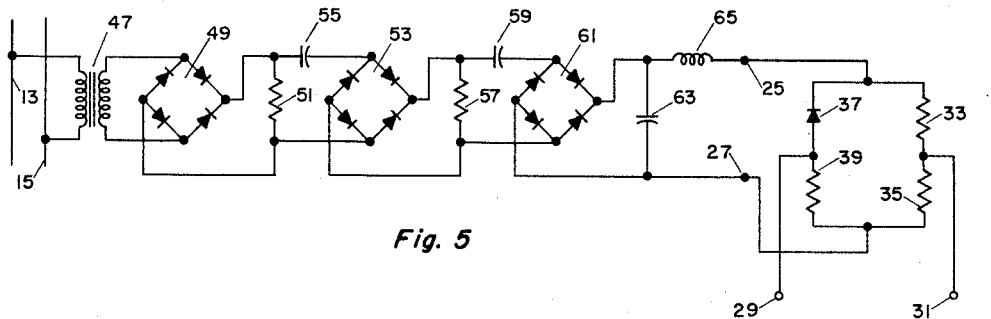
JOSEPH GRILLO
*INVENTOR.*
BY
ATTORNEYS United States Patent Office 3,184,673
Patented May 18, 1965

3,184,673
VOLTAGE REGULATOR WITH FREQUENCY
MULTIPLICATION DETECTOR MEANS
Joseph Grillo, New Milford, N.J., assignor to General
Precision Inc., Little Falls, N.J., a corporation of
Delaware
Filed Dec. 8, 1961, Ser. No. 157,986
4 Claims. (Cl. 322—28)

This invention relates to voltage regulation, and more particularly to a voltage regulation system for a single phase A.C. generator with an improved detector circuit.

Voltage regulation of A.C. generators is generally achieved by producing a D.C. signal voltage proportional to the amplitude of the A.C. output of the A.C. generator, comparing the D.C. signal voltage with some standard to produce an error signal, and controlling the field excitation of the A.C. generator in accordance with the error signal. The circuit which produces the D.C. signal voltage is referred to as the detector circuit and in the systems of the prior art it usually comprises a full wave rectifier and a filter to eliminate the 48% ripple inherent in the output voltage of the rectifier. The amount of filtering required in the systems of the prior art makes these systems have a slow response and adversely affects their stability.

In the system of the present invention, the amount of filtering required is greatly reduced and thus the speed of response is increased and the stability is improved. According to the present invention, the frequency of the A.C. generator output voltage is multiplied and then rectified to produce the D.C. signal voltage, which is compared with the standard. Because of this frequency multiplication, the necessary filtering in the system of the present invention is considerably less than in the systems of the prior art and the regulating performance of the system of the present invention is therefore much superior.

Accordingly, a principal object of the present invention is to provide an improved voltage regulated system.

Another object of the present invention is to reduce the response time and increase the stability of voltage regulated systems.

A further object of this invention is to provide a voltage regulated system with an improved detector circuit for single phase machines or for polyphase machines in which only one phase is regulated.

A still further object of this invention is to reduce the amount of filtering required in the detector circuit in voltage regulated systems.

A still further object of this invention is to reduce ripple in the detector circuit of voltage regulated systems without increasing the response time or adversely affecting the stability of the system.

A still further object of this invention is to provide an improved detector circuit.

Further objects and advantages of the present invention will become readily apparent as the following detailed description of the invention unfolds and when taken in conjunction with the drawings, wherein:

FIG. 1 is a block diagram of a voltage regulated system of the type to which the present invention applies;

FIG. 2 is a circuit diagram of a bridge network which compares the D.C. signal voltage produced by the detector circuit with a standard and produces an error signal;

FIG. 3 shows the characteristic of the bridge network of FIG. 2;

FIG. 4 is a circuit diagram showing a detector circuit connected with the bridge network as used in systems of the prior art; and FIG. 5 is a circuit diagram showing a detector circuit connected with the bridge network as used in the voltage regulated system of the present invention.

The A.C. generator to be regulated is designated in FIG. 1 by the reference number 11. The generator 11 produces an A.C. voltage across output lines 13 and 15. A detector circuit 17 has its input connected across lines 13 and 15 and produces a D.C. signal voltage proportional to the amplitude of the A.C. voltage produced across lines 13 and 15. The output signal voltage of the detector circuit 17 is applied to a bridge network 19, in which the output signal voltage of the detector circuit 17 is compared to a standard. From this comparison an error signal voltage is generated. The error signal voltage generated by the bridge network 19 will be proportional to the difference between the actual A.C. output voltage of the generator 11 and the desired A.C. output voltage of the generator 11. The error signal produced by the bridge network 19 is amplified by an amplifier 21 and applied to a field winding 23 of the generator 11 to control the excitation thereof. If the A.C. voltage produced across lines 13 and 15 starts to rise from the desired value, then the bridge network 19 will produce an error signal output of one polarity and in response to this signal the amplifier 21 will change the excitation of the field winding 23 in a direction to decrease the A.C. output voltage produced across lines 13 and 15, thus counteracting the rise in output voltage of the A.C. generator. If the A.C. voltage across lines 13 and 15 starts to drop, the bridge network 19 will produce an error signal of the opposite polarity and in response to this signal of the opposite polarity the amplifier 21 will change the excitation of the field winding 23 in a direction to increase the output voltage produced across lines 13 and 15, thus counteracting the drop in output voltage of the A.C. generator.

The bridge network 19 as shown in detail in FIG. 2 comprises a pair of input terminals 25 and 27 and a pair of output terminals 29 and 31. The D.C. signal voltage produced by the detector circuit 17 is applied across the input terminals 25 and 27 and the error signal voltage is produced by the bridge network across the output terminals 29 and 31. In the bridge network a Zener diode 37 is connected between the input terminal 25 and the output terminal 29. A resistor 39 is connected between the input terminal 27 and the output terminal 29. A resistor 33 is connected between the input terminal 25 and the output terminal 31 and a resistor 35 is connected between the input terminal 27 and the output terminal 31. The bridge network is designed to have the plus side of the output signal voltage from the detector circuit 17 applied to the input terminal 25 and the minus side of the signal voltage produced by the detector circuit 17 applied to the terminal 27. With this arrangement the Zener diode 37 operates in its breakdown region and provides a constant voltage drop between the input terminal 25 and the output terminal 29. With this arrangement the bridge network will produce a linear output error signal across terminals 29 and 31 which will have a characteristic as illustrated in FIG. 3. This error signal is applied to the input of the amplifier 21.

Prior to the present invention, the detector circuit 17 usually comprised a full wave rectifier connected across the output leads 13 and 15, as illustrated in FIG. 4, in which the full wave rectifier has been designated by the reference number 41. The full wave rectified output voltage from the rectifier 41 is applied in this prior art system across input terminals 25 and 27 of the bridge network through a filter comprising an inductor 43 and a capacitor 45. The positive output terminal of the rectifier 41 is connected through the inductor 43 to the input terminal 25 and the negative output terminal of the rectifier 41 is connected directly to the input terminal 27. The capacitor 45 is connected across the input terminals 25 and 27 of the bridge network. The inductor 43 and the capacitor 45 must have values selected to provide a large amount of filtering to eliminate the ripple that exists in the full wave rectified output voltage of the rectifier 41. With this arrangement the voltage applied across terminals 25 and 27 will be proportional to the A.C. output voltage of the generator 11. However, because of the large amount of filtering provided by the inductor 43 and the capacitor 45, the system making use of the detector circuit shown in FIG. 4 will have a slow response and will not have good stability.

The detector circuit of the system of the present invention is shown in FIG. 5. The output voltage of the A.C. generator produced across lines 13 and 15 is applied across the primary winding of a transformer 47. The secondary winding of the transformer 47 is connected across the input terminals of a full wave rectifier 49. A resistance 51 is connected across the output terminals of the rectifier 49. The output terminals of the rectifier 49 are connected across the input terminals of a full wave rectifier 53 through a capacitor 55. The output voltage of the rectifier 49 will have a 48% ripple, which has twice the frequency of the A.C. voltage on lines 13 and 15 applied across the primary winding of the transformer 47. The D.C. component in the output voltage of the rectifier 49 is blocked from the rectifier 53 by means of the capacitor 55 and is shunted through the resistor 51. Only the A.C. component comprising the 48% ripple at twice the frequency of the A.C. generator output is applied across the input terminals of the rectifier 53. The resulting full wave rectified output voltage of the rectifier 53 will have an A.C. ripple component of four times the frequency of the voltage applied across the primary winding of the transformer 47. The D.C. component in the output voltage of the rectifier 53 is shunted through a resistor 57, which is connected across the output terminals of the rectifier 53. The A.C. ripple component in the output of the rectifier 53 is applied through a capacitor 59 across the input terminals of a full wave rectifier 61. The capacitor 59 blocks the D.C. component in the output voltage of the rectifier 53 from being applied to the input of the rectifier 61. The rectifier 61 rectifies the A.C. voltage applied across its input terminals and produces a D.C. output voltage which is proportional to the amplitude of the A.C. voltage produced by the generator 11 applied across the primary winding of the transformer 47. A capacitor 63 is connected across the output terminals of the rectifier 61 and the positive terminal of the rectifier 61 is connected through an inductor 65 to the input terminal 25 of the bridge network. The negative output terminal of the rectifier 61 is connected directly to the input terminal 27 of the bridge network. The capacitor 63 and the inductor 65 comprise a filter to eliminate the A.C. ripple in the output voltage of the rectifier 61, but because the ripple in this output voltage is at four times the frequency of the ripple in the output voltage of the rectifier 41 of the system shown in FIG. 4, the filtering provided by the inductor 65 and the capacitor 63 does not have to be nearly as great as that provided by the filter in the system shown in FIG. 4 and the values of the inductor 65 and the capacitor 63 are selected accordingly. As a result the system of the invention making use of the detector circuit shown in FIG. 5 will have a much faster response than the system of the prior art making use of the detector circuit shown in FIG. 4 and it will also have superior stability.

To further increase the speed of response and increase the stability of the system, the frquency of the output voltage of the generator 11 can be further multiplied simply by adding additional multiplication stages such as that comprising the rectifier 49, the resistor 51 and the capacitor 55. Also other kinds of frequency multipliers can be used than that shown in FIG. 5. These and many other modifications may be made to the above described specific embodiment of the invention without departing from the spirit and scope of the invention, which is defined in the appended claims.

What is claimed is:

1. A voltage regulated system comprising:
   an A.C. generator having a field winding and output terminals;
   a transformer having a primary winding connected across said output terminals and a secondary winding inductively coupled to the primary winding;
   a full-wave rectifier having input and output terminals;
   a bridge network having diagonally opposite input and output terminals, three arms of the bridge network consisting of resistive impedances and the fourth arm consisting of a Zener diode having one electrode connected to one of the input terminals of the bridge network;
   inductive impedance means coupling one of the output terminals of said rectifier to said one input terminal of the bridge network, the other rectifier output terminal being connected to the other input terminals of the bridge network;
   capacitor means shunting the output terminals of said rectifier;
   at least one frequency multiplication stage coupling the secondary winding of said transformer across the input of said rectifier; and
   means coupling said field winding across the output terminals of said bridge network.

2. A voltage regulated system according to claim 1, wherein said last-mentioned coupling means includes an amplifier.

3. A voltage regulated system according to claim 2, wherein said frequency multiplication stage includes a full wave bridge rectifier, a resistive impedance shunting the signal input path to said bridge rectifier, and capacitance means in series with said signal input path.

4. A voltage regulated system comprising:
   an A.C. generator having a field winding and output terminals;
   a transformer having a primary winding connected across said output terminals and a secondary winding inductively coupled to the primary winding;
   a full wave rectifier having input and output terminals;
   a bridge network having diagonally opposite input and output terminals, three arms of the bridge consisting of resistive impedances and the fourth arm consisting of a Zener diode having one electrode connected to one of the input terminals of the bridge network;
   inductive impedance means coupling one of the output terminals of said rectifier to said one input terminal of the bridge network, the other rectifier output terminal being connected to the other input terminal of the bridge network;
   capacitor means shunting the output terminals of said rectifier;
   means including an amplifier coupling said field winding across the output terminals of said bridge network; and a plurality of frequency multiplication stages coupling the secondary windings of said transformer across the input of said rectifier, each of said frequency multiplication stages including a full wave bridge rectifier, a resistive impedance shunting the signal input path to said bridge rectifier, and capacitance means in series with said signal input path.

References Cited by the Examiner
UNITED STATES PATENTS

| | | | |
|---|---|---|---|
| 2,803,711 | 8/57 | Wiggin et al. | 321—65 |
| 2,882,480 | 4/59 | Bradburn et al. | 322—28 |
| 2,891,213 | 6/59 | Kern | 322—79 |
| 3,008,082 | 11/61 | Schluher | 322—28 |

LLOYD McCOLLUM, *Primary Examiner.*